(12) United States Patent
Zhang et al.

(10) Patent No.: US 11,677,630 B2
(45) Date of Patent: Jun. 13, 2023

(54) SECURE DEVICE MANAGEMENT

(71) Applicant: Cisco Technology, Inc., San Jose, CA (US)

(72) Inventors: Lele Zhang, Shanghai (CN); Li Zhao, Shanghai (CN); Haibo Dong, Shanghai (CN); Yihua Dai, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/246,301

(22) Filed: Apr. 30, 2021

(65) Prior Publication Data
US 2022/0353149 A1 Nov. 3, 2022

(51) Int. Cl.
*H04L 41/12* (2022.01)
*H04L 9/40* (2022.01)

(52) U.S. Cl.
CPC ............ *H04L 41/12* (2013.01); *H04L 63/062* (2013.01); *H04L 63/065* (2013.01); *H04L 63/0892* (2013.01)

(58) Field of Classification Search
CPC ..... H04L 41/12; H04L 63/062; H04L 63/065; H04L 63/0892
See application file for complete search history.

(56) References Cited

U.S. PATENT DOCUMENTS

| | | | | |
|---|---|---|---|---|
| 8,644,255 B1* | 2/2014 | Burcham | ............. | H04W 88/06 370/339 |
| 9,949,116 B2* | 4/2018 | Li | ......................... | H04W 12/06 |
| 11,032,708 B2* | 6/2021 | Hsiao | .................. | H04L 63/0471 |
| 11,166,157 B2* | 11/2021 | Olshansky | ........ | H04W 12/0433 |
| 11,431,660 B1* | 8/2022 | Leeds | .................... | G06N 3/045 |
| 11,563,860 B2* | 1/2023 | Sharma | ............. | H04M 15/8083 |
| 2011/0040969 A1 | 2/2011 | Yao | | |
| 2011/0063990 A1* | 3/2011 | Nogawa | ................ | H04W 76/19 370/252 |
| 2013/0036305 A1* | 2/2013 | Yadav | ..................... | H04L 63/12 713/168 |

(Continued)

FOREIGN PATENT DOCUMENTS

| | | |
|---|---|---|
| EP | 2731292 A1 | 5/2014 |
| NO | 2019084340 A1 | 5/2019 |

OTHER PUBLICATIONS

"Cisco Connected Grid Wpan Module for Cgr 1000 Series Installation and Cg-Mesh Configuration Guide," retrieved at »https://www.cisco.com/c/en/US/td/docs/routers/connectedgrid/modules/wpan/release_5-0/Cisco_Connected_Grid_WPAN_Module_for_CGR_1000_Series_Installation_and_CG-Mesh_Configuration_Guide.html>> Janaury 28, 2016, 63 pages.

(Continued)

*Primary Examiner* — Dhairya A Patel
(74) *Attorney, Agent, or Firm* — Lee & Hayes, P.C.

(57) ABSTRACT

Techniques are described for managing devices using multiple virtual personal area networks (VPANs). A border router can receive a first request to join a network from a first device. The first device may be assigned to a first virtual personal area network (VPAN), which has an associated first group temporal key (GTK). The first GTK can be distributed to the first virtual device. The border router can also receive a second request to join a network from a second device. The second device may be assigned to a second VPAN, which has an associated second GTK. The second GTK can be distributed to the second virtual device.

20 Claims, 9 Drawing Sheets

(56) References Cited

U.S. PATENT DOCUMENTS

| | | | |
|---|---|---|---|
| 2013/0138786 A1* | 5/2013 | Ji | H04L 12/00 709/223 |
| 2014/0095864 A1* | 4/2014 | Dasgupta | H04L 63/0884 380/279 |
| 2014/0119543 A1* | 5/2014 | Yu | H04W 12/041 380/270 |
| 2015/0106625 A1 | 4/2015 | Yadav et al. | |
| 2016/0080416 A1* | 3/2016 | Purohit | H04L 12/18 713/151 |
| 2016/0205078 A1* | 7/2016 | James | H04L 9/006 713/171 |
| 2017/0208039 A1* | 7/2017 | Godfrey | G06F 9/00 |
| 2017/0223053 A1* | 8/2017 | Dhanabalan | H04L 67/14 |
| 2018/0139202 A1* | 5/2018 | Sethi | H04W 84/12 |
| 2018/0187455 A1* | 7/2018 | Livshits | H04W 4/80 |
| 2018/0316673 A1* | 11/2018 | Shah | H04W 12/06 |
| 2019/0141572 A1 | 5/2019 | Zaks et al. | |
| 2019/0200220 A1 | 6/2019 | Ouzieli et al. | |
| 2020/0162994 A1* | 5/2020 | Jayawardena | H04W 40/02 |
| 2020/0267541 A1 | 8/2020 | Huang et al. | |
| 2020/0396604 A1* | 12/2020 | Olshansky | H04W 12/069 |
| 2021/0050999 A1* | 2/2021 | Huang | H04L 9/3242 |
| 2021/0243604 A1* | 8/2021 | Lepp | H04W 12/084 |
| 2021/0365233 A1* | 11/2021 | Grady | G10L 19/167 |
| 2022/0272179 A1* | 8/2022 | Decenzo | H04L 12/12 |
| 2022/0279356 A1* | 9/2022 | Kudtarkar | H04W 12/69 |
| 2023/0025116 A1* | 1/2023 | Zhao | H01R 13/6691 |

OTHER PUBLICATIONS

Copy of PCT Search Report and Written Opinion mailed Aug. 16, 2022 for PCT Application No. PCT/US22/34501, 13 pages.

* cited by examiner

400

```
┌─────────────────────────────────────────────────────────────┐
│  A FIRST DEVICE IN A FIRST VPAN CONTACTS A SECOND DEVICE IN A SECOND │
│  VPAN AND REQUESTS ACCESS TO A BORDER ROUTER WITH WHICH THE SECOND   │
│         DEVICE IS ALREADY COMMUNICATING.                    │
│                      402                                    │
└─────────────────────────────────────────────────────────────┘
                              │
                              ▼
┌─────────────────────────────────────────────────────────────┐
│  THE FIRST DEVICE IS AUTHORIZED BY AN AAA (AUTHENTICATION,  │
│  AUTHORIZATION, AND ACCOUNTING) SERVER AND A TEMPORARY GTK IS │
│  GENERATED BY THE AAA SERVER, SUCH THAT THE TEMPORARY GTK IS VALID │
│           FOR A LIMITED TIME PERIOD                         │
│                      404                                    │
└─────────────────────────────────────────────────────────────┘
                              │
                              ▼
┌─────────────────────────────────────────────────────────────┐
│  THE TEMPORARY GTK IS COMMUNICATED FROM THE AAA SERVER TO THE │
│  SECOND DEVICE, WHICH SUPPORTS TEMPORARY COMMUNICATION BETWEEN THE │
│  SECOND DEVICE AND THE FIRST DEVICE DURING THE LIMITED TIME PERIOD │
│                      406                                    │
└─────────────────────────────────────────────────────────────┘
                              │
                              ▼
┌─────────────────────────────────────────────────────────────┐
│  THE FIRST DEVICE COMMUNICATES WITH THE BORDER ROUTER (VIA THE SECOND │
│   DEVICE) USING THE TEMPORARY GTK DURING THE LIMITED TIME PERIOD │
│                      408                                    │
└─────────────────────────────────────────────────────────────┘
```

```
┌─────────────────────────────────────────────────────────────────────┐
│ A FIRST DEVICE IN A FIRST VPAN COMMUNICATES WITH A BORDER ROUTER    │
│ THROUGH A SECOND DEVICE IN A SECOND VPAN, WHERE THE SECOND DEVICE IS│
│                  CONNECTED TO THE BORDER ROUTER                     │
│                                 602                                 │
└─────────────────────────────────────────────────────────────────────┘
                                  │
                                  ▼
┌─────────────────────────────────────────────────────────────────────┐
│               A THIRD DEVICE BECOMES ACTIVE IN THE FIRST VPAN       │
│                                 604                                 │
└─────────────────────────────────────────────────────────────────────┘
                                  │
                                  ▼
┌─────────────────────────────────────────────────────────────────────┐
│        THE THIRD DEVICE ESTABLISHES A CONNECTION WITH THE BORDER ROUTER │
│                                 606                                 │
└─────────────────────────────────────────────────────────────────────┘
                                  │
                                  ▼
┌─────────────────────────────────────────────────────────────────────┐
│ THE FIRST DEVICE TERMINATES ITS COMMUNICATION WITH THE SECOND DEVICE│
│AND ESTABLISHES A CONNECTION WITH THE THIRD DEVICE TO COMMUNICATE WITH│
│                        THE BORDER ROUTER                            │
│                                 608                                 │
└─────────────────────────────────────────────────────────────────────┘
```

FIG. 6

SECURE DEVICE MANAGEMENT

TECHNICAL FIELD

The present disclosure relates generally to secure group management of devices using multiple virtual personal area networks.

BACKGROUND

In some network environments, multiple types of devices manufactured by multiple vendors may access the same network. For example, multiple devices may be coupled to the same network and connected to the same border router associated with the network. The network can be a personal area network (PAN) that connects one or more smart lighting devices, one or more door security devices, and the like.

The PAN may use a common security key, such as a group temporal key (GTK), for all devices coupled to the network. The common security key is used to encrypt and decrypt data based on one or more protocols. For example, a lighting device and a door security device may use the same security key associated with the PAN. In some situations, the lighting device and the door security device have different levels of security protection. For example, the lighting device may have a lower level of security protection than the door security device because hacking into a lighting device poses minimal risk. In contrast, hacking into a door security device poses significant risk by allowing unauthorized people to access a building, or a specific part of a building, that contains valuable items or critical information.

When devices with different levels of security protection are coupled to the same PAN and use the same security key, it presents a security risk for the PAN. In the above example, a person attempting to illicitly access a door security device (or any other device in the PAN) may first hack into the lighting device that has a lower level of security protection. Once the person has hacked into the lighting device and obtained the security key from the lighting device, the same security key may be used to access the door security device and any other device in the PAN. Thus, the lighting device provides a weak link in the security of all devices coupled to the same PAN, which are using the same security key.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for operating the network shown in FIG. 3.

FIG. 6 illustrates a flow diagram of an example method for operating the network shown in FIG. 5.

DESCRIPTION OF EXAMPLE EMBODIMENTS

Overview

Figure 1:
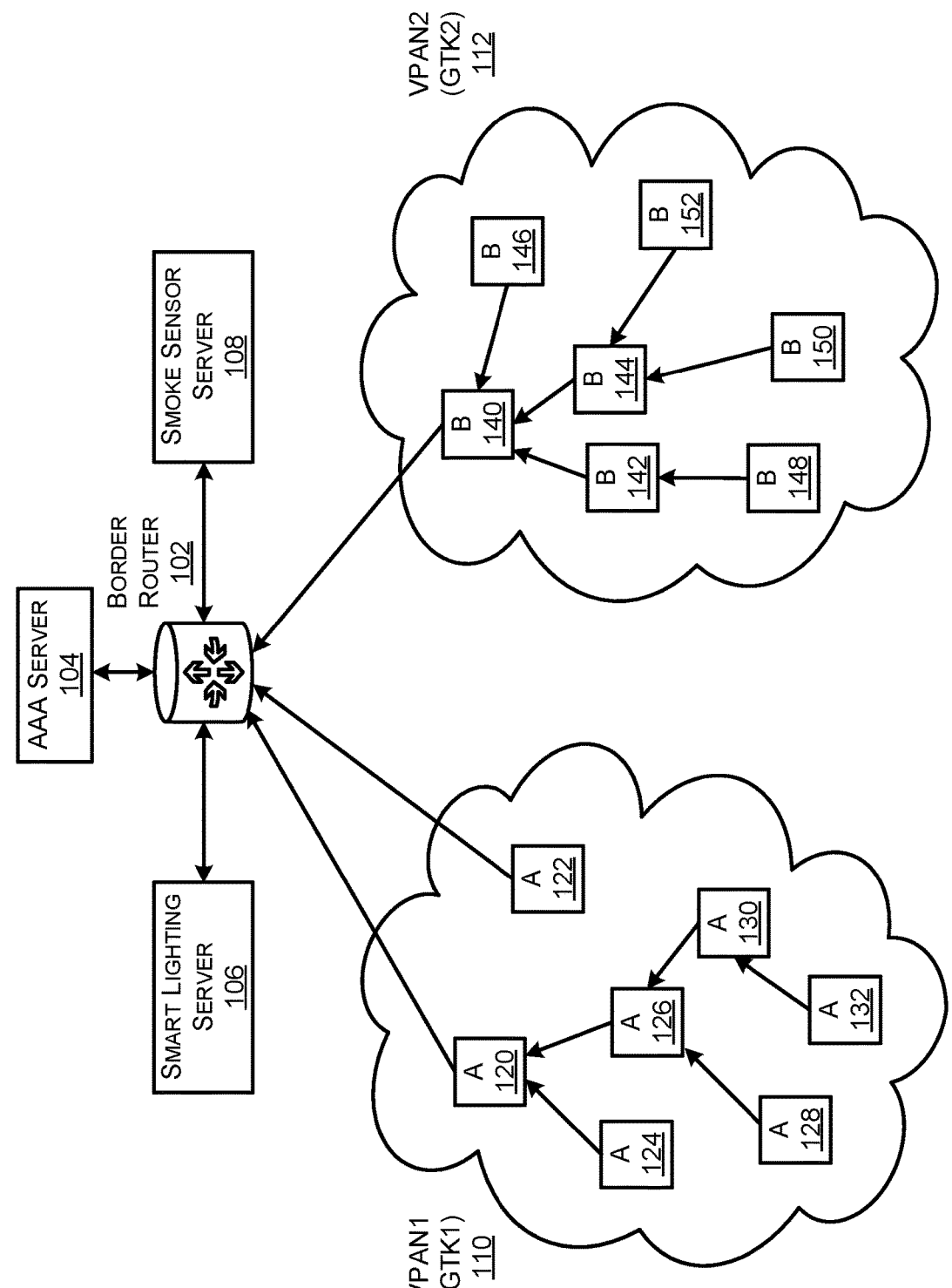
FIG. 1 illustrates a system-architecture diagram of an example network containing multiple devices, servers, and a border router.

This disclosure describes techniques for providing secure remote access to network devices based on a virtual personal access network (VPAN) architecture. In some embodiments, a method, implemented at least partially by a border router, receives a first request to join a network from a first device. The method assigns the first device to a first VPAN, where the first VPAN has an associated first group temporal key (GTK). The method distributes the GTK to the first device. The method also receives, at the border router, a second request to join the network from a second device. The second device is assigned to a second VPAN, where the second VPAN has an associated second GTK. The method continues by distributing the second GTK to the second device. Additionally, the method may assign a first sub-SSID (Service Set Identifier) to the first VPAN and assign a second sub-SSID to the second VPAN. In particular embodiments, the first VPAN may be associated with a first category of devices and the second VPAN may be associated with a second category of devices, where the first category of devices is different from the second category of devices. The first and second categories of devices may include a device type, a device security level, a device manufacturer, a device owner, or a device location. The method may further include authenticating the first device by an authentication, authorization, and accounting server. In some embodiments, the first GTK is a temporary GTK that is valid for a limited period of time.

Additionally, the techniques described herein may be performed by a system and/or device having non-transitory computer-readable media storing computer-executable instructions that, when executed by one or more processors, performs the method described above.

Example Embodiments

The use of IoT (Internet of Things) devices, and other connected systems, is growing rapidly. IoT devices may include physical objects that can be embedded in sensors, controllers, monitors, and other systems. These IoT devices may communicate with one another via the Internet or other data communication network. In some embodiments, multiple IoT devices are coupled to communicate with one another via a wireless network, such as a personal area network (PAN).

This disclosure describes systems and methods for secure management in, for example, multi-hop and channel hopping wireless mesh networks, such as CG-Mesh (Connected Grid Mesh) or Wi-SUN (Wireless Smart Utility Network). Existing multi-hop and channel hopping wireless mesh networks are vulnerable to attack due to the open nature of the wireless medium. The systems and methods discussed herein provide a more secure environment by dividing a physical border router or mesh node into multiple virtual personal area networks (VPANs), where each VPAN uses an independent group temporal key (GTK). Thus, if one VPAN is hacked to obtain the GTK associated with the VPAN, the other VPANs remain secure because they use different GTKs. As discussed herein, the systems and methods include an independent authentication, authorization, accounting (AAA) system to secure the networks and simplify deployment of the network devices.

Although the systems and methods described herein are discussed with respect to one or more VPANs, these systems and methods may be used with any type of network (including multiple different networks). Further, although particular examples are discussed with reference to IoT devices, alternate embodiments may use other types of devices that communicate with one another and may communicate with a border router, as described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network 100 containing multiple devices, servers, and a border router. Network 100 includes a border router 102 coupled to an AAA server 104, a smart lighting server 106, and a smoke sensor server 108. Border router 102 is a router that may be located between two networks, such as an enterprise network and a service provider network. AAA server 104 may control access to one or more networks, such as network 100 shown in FIG. 1. AAA server 104 may perform various functions related to authenticating devices, authorizing activities, and tracking the usage of resources. For example, AAA server 104 may authenticate devices that communicate (e.g., broadcast) a request to join a network. Smart lighting server 106 may control and monitor any number of lighting devices associated with one or more networks, as discussed herein. Smoke sensor server 108 may control and monitor any number of smoke sensors associated with one or more networks, as discussed herein.

FIG. 1 also illustrates a first VPAN 110 (labeled VPAN1) that has an associated first GTK (labeled GTK1) and a second VPAN 112 (labeled VPAN2) that has an associated second GTK (labeled GTK2). First VPAN 110 includes multiple devices (also referred to as "nodes") 120, 122, 124, 126, 128, 130, and 132). Second VPAN 112 also includes multiple devices 140, 142, 144, 146, 148, 150, and 152). In some embodiments, one or more of devices 120-132 and 140-152 are IoT devices.

As shown in FIG. 1, first VPAN 110 and second VPAN 112 are coupled to border router 102. Thus, devices 120-132 and 140-152 can communicate with border router 102 directly or via another device. For example, devices 120, 122, and 140 can communicate with border router 102 directly. The remaining devices (124-132 and 142-152) can communicate with border router 102 through another device. For example, device 130 communicates with border router 102 by communicating through device 126 and 120. These communications by one device through another device may be referred to as hops.

As shown in FIG. 1, devices 120-132 are labeled "A" to distinguish the devices in first VPAN 110 from devices 140-152 labeled "B" in second VPAN 112. In some examples, each device 120-132 and 140-152 is assigned an SSID (Service Set Identifier) when the device is deployed (e.g., installed in a network). In some embodiments, an SSID is an ASCII string of characters.

The systems and methods described herein allow a single border router to support multiple different sub-SSIDs, where each sub-SSID identifies a different VPAN. As discussed herein, each VPAN uses a different GTK for improved security. In some embodiments, the SSID field is composed of two ASCII strings: a main-SSID and a sub-SSID. All devices in the same VPAN have the same main-SSID (e.g., ciscoabc12), but different devices may have different sub-SSIDs. For example, devices related to lighting devices may have a sub-SSID of "lighting," devices related to smoke detection may have a sub-SSID of "smoke," and devices related to utility meters may have a sub-SSID of "meter."

In the example of FIG. 1, border router 102 uses a main-SSID of "ciscoabc12" for all devices 120-132 and 140-152. The group of devices 120-132 associated with the first VPAN 110 are lighting devices and have a sub-SSID of "lighting." Thus, devices 120-132 have a full SSID of ciscoabc12-lighting. Devices 120-132 use a first GTK associated with the first VPAN 110.

The group of devise 140-152 associated with the second VPAN 112 are smoke sensor devices and have a sub-SSID of "smoke." Thus, devices 140-152 have a full SSID of ciscoabc12-smoke. Devices 140-152 use a second GTK associated with the second VPAN 112.

Thus, the configuration of FIG. 1 allows devices in the first VPAN 110 to have different SSIDs and different GTKS from the devices in the second VPAN 112. If a person or system is able to hack into one VPAN and access the GTK for that VPAN, they are still prevented from accessing devices in the other VPAN that has a different GTK. Therefore, hacking into one of the lighting devices 120-132 does not provide access to smoke detection devices 140-152.

In some examples, a device may prefer to join a VPAN with the same sub-SSID, which provides increased security. But, in particular situations, a device may join a VPAN with a different sub-SSID if permitted by a proxy device or AAA server 104.

In some implementations, sub-SSIDs may be used for particular types of devices, such as lighting devices, smoke sensor devices, utility meters, door security devices, and the like. As discussed herein, grouping the same types of devices in a VPAN with the same sub-SSID improves security by using a common GTK. In other implementations, sub-SSIDs can be used to group devices associated with a particular vendor or manufacturer. In these situations, the particular vendor or manufacturer may not want their devices sharing information and the GTK with devices from other vendors or manufacturers.

In other implementations, sub-SSIDs can be associated with a particular installation location, such as a particular campus, building, or portion of a building. In some examples, different sub-SSIDs are associated with different security levels. For example, high-security devices may be associated with a first sub-S SID and low-security devices may be associated with a second sub-SSID. As discussed herein, each sub-SSID has its own GTK. This use of multiple sub-SSIDs (with different GTKS) for different security levels reduces the likelihood that a person or system can hack into a low-security device in an attempt to gain access to a higher security device.

The configuration of FIG. 1 allows a single border router 102 to support multiple groups of devices, where each group of devices has an associated sub-S SID and GTK. This configuration reduces cost by allowing border router 102 to support multiple groups of devices instead of providing a separate border router for each group of devices. The configuration of FIG. 1 also simplifies the overall system by eliminating the need for multiple border routers. In some embodiments, border router 102 may support any number of sub-SSIDs and any number of GTKs to support the multiple sub-SSIDs.

The above-noted example is merely illustrative, and various changes may be made to achieve similar or the same results. For example, each VPAN 110 and 112 may include any number of devices. Additionally, a particular network 100 may include any number of VPANs 110, 112 and any number of other devices, servers, and systems.

Figure 2:
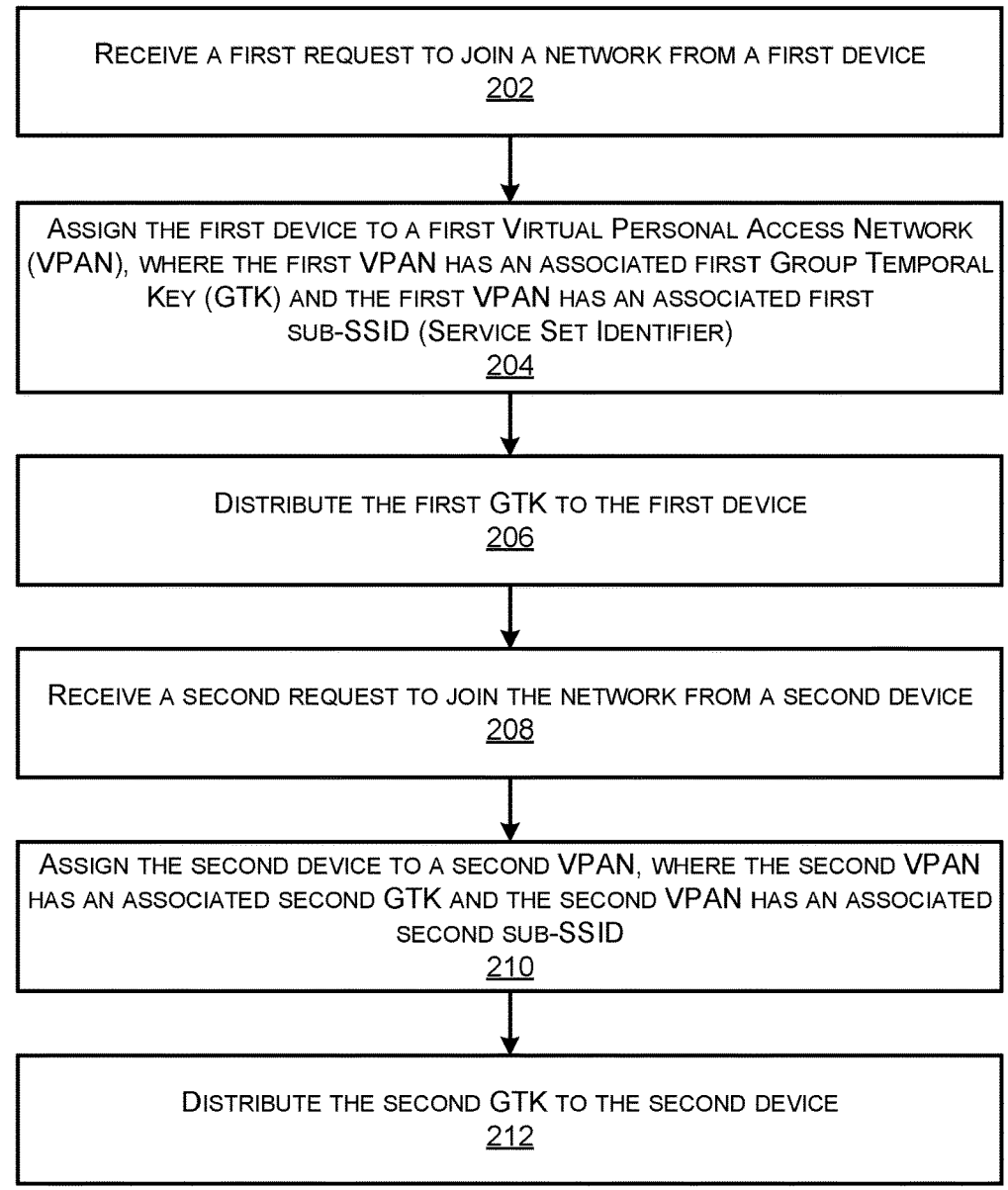
FIG. 2 illustrates a flow diagram of an example method for operating the network shown in FIG. 1.

FIG. 2 illustrates a flow diagram of an example method 200 for operating the network shown in FIG. 1. The operations described herein with respect to the method 200 may be performed by various components and systems, such as the components illustrated in FIG. 1.

At operation 202 of method 200, the process may receive a first request to join a network from a first device, such as an IoT device. For example, the first request to join a network may be received by border router 102 directly from the first device or via one or more intermediary devices (e.g., via "hops"). In some implementations, the first request may be authorized by AAA server 104 or other system.

At operation 204, the process may assign the first device to a first VPAN such that the first VPAN has an associated first GTK and an associated first sub-SSID. In some embodiments, the first device may be assigned to a particular VPAN based on a device type, a device vendor, a device manufacturer, a device security level, and the like.

At operation 206, the process may distribute the first GTK to the first device. In some embodiments, the first GTK may be distributed directly to the first device or distributed via one or more intermediary devices.

At operation 208, the process may receive a second request to join the network from a second device. As discussed with respect to operation 202, the second request to join the network may be received by border router 102 directly from the second device or via one or more intermediary devices. In some implementations, the second request may be authorized by AAA server 104 or other system.

At operation 210, the process may assign the second device to a second VPAN such that the second VPAN has an associated second GTK and an associated second sub-SSID. In implementations, the second GTK is different from the first GTK and the second sub-S SID is different from the first sub-SSID. In some embodiments, the second device may be assigned to a particular VPAN based on a device type, a device vendor, a device manufacturer, a device security level, and the like.

At operation 212, the process may distribute the second GTK to the second device. In some embodiments, the second GTK may be distributed directly to the second device or distributed via one or more intermediary devices.

In some device deployment situations, it may be difficult to ensure that there is a reliable existing device with the same sub-S SID as the new device being deployed. In this situation, a proxy device can provide a joining function for a different VPAN. The AAA server will manage the authorization and accounting of the new device being deployed. This approach provides value in various situations.

For example, a first utility company in a particular geographic region may have a network of utility meters. If a second utility company wants to use the existing network of utility meters, the first utility company may resist due to the potential security risk. This security concern can be alleviated by creating a VPAN for the utility meters of the second utility company. This approach keeps the utility meters of the first utility company separated from the utility meters of the second utility company.

Figure 3:
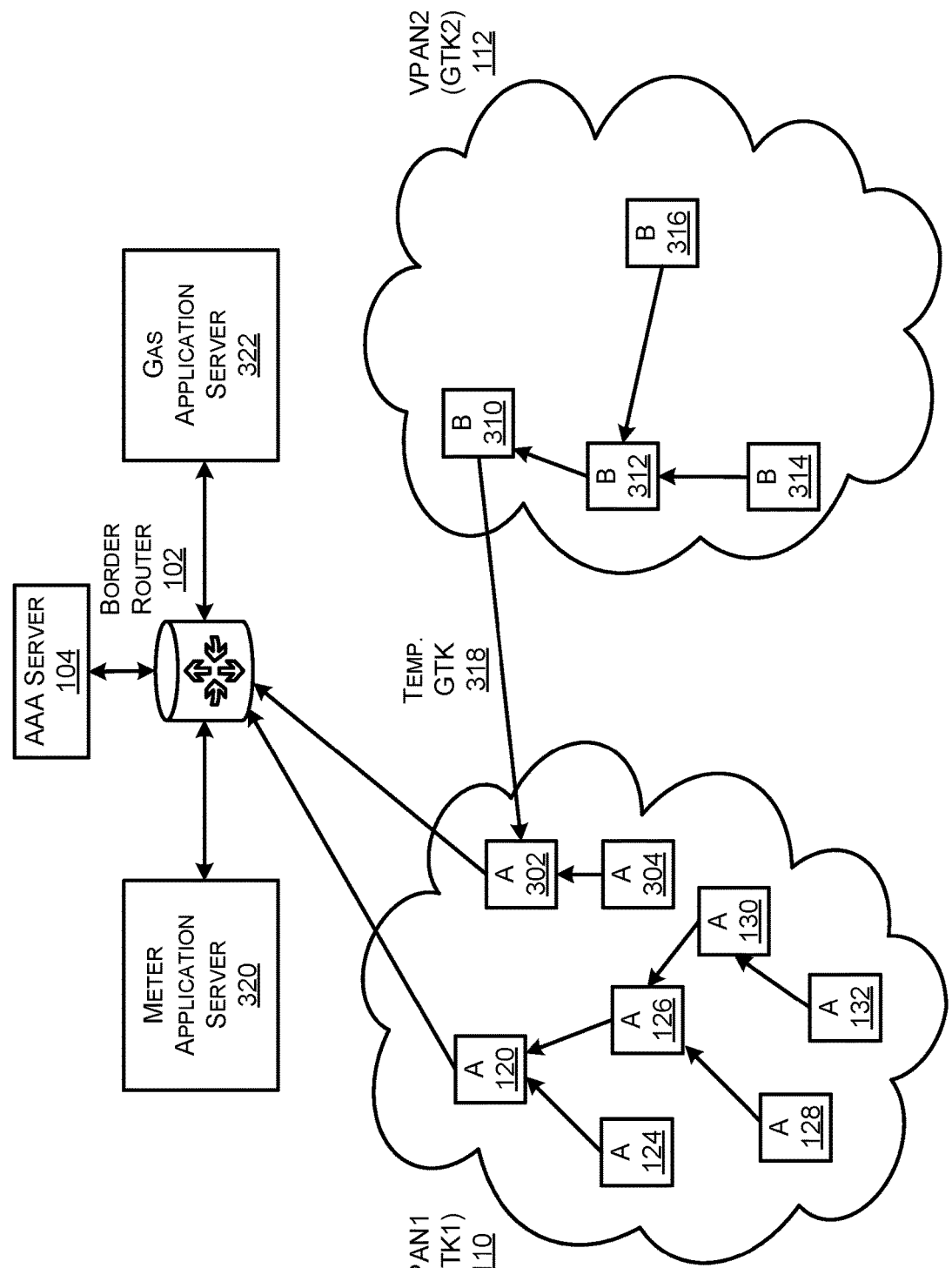
FIG. 3 illustrates another system-architecture diagram of an example network containing multiple devices, servers, and a border router.

FIG. 3 illustrates another system-architecture diagram of an example network 300 containing multiple devices, servers, and a border router. In the example of FIG. 3, a new device wants to join a VPAN by proxy.

Network 300 includes border router 102 and AAA server 104 as discussed above with respect to FIG. 1. Network 300 also includes a meter application server 320 and a gas application server 322. Meter application server 320 may control and monitor any number of meter devices, as discussed herein. Gas application server 322 may control and monitor any number of gas meter devices associated with one or more networks, as discussed herein.

Additionally, network 300 includes first VPAN 110 and second VPAN 112, but the two VPANs 110 and 112 have different associated devices. First VPAN 110 includes associated devices 120, 124, 126, 128, 130, 132, 302, and 304. Second VPAN 112 includes associated devices 310, 312, 314, and 316. As discussed above with respect to FIG. 1, first VPAN 110 may have a first associated GTK and second VPAN 112 may have a second associated GTK.

In some embodiments, devices 120, 124, 126, 128, 130, 132, 302, and 304 are meter devices controlled and monitored by meter application server 320. And, in some embodiments, devices 310, 312, 314, and 316 are gas meter devices controlled and monitored by gas application server 322.

In the example of FIG. 3, the devices 310, 312, 314, and 316 do not have a connection to border router 102. In this situation, one of the devices in second VPAN 112, such as device 310, may communicate with device 302 in VPAN 110. Since device 302 is already connected with border router 102, it may provide a joining proxy for the second VPAN 112. For example, device 302 may receive a request from device 310 to access border router 102 (e.g., requesting to connect with border router 102). Device 302 may forward the request from device 310 to border router 102 for processing. If approved by AAA server 104, a temporary GTK 318 may be generated and communicated to devices 302 and 310, thereby allowing devices in second VPAN 112 to communicate with router 102 via device 302. In some implementations, the temporary GTK 318 allows device 302 to merely forward messages received from device 310 to border router 102. Device 302 does not typically decrypt the data received from device 310. Thus, device 302 can use a different GTK than second VPAN 112 since it is not attempting to decrypt the data.

In some embodiments, temporary GTK 318 has a specific "lifetime" as determined by AAA server 104 and/or border router 102. An example lifetime for temporary GTK 318 may be a few minutes, a few hours, or a few days depending on the situation and the time period for which second VPAN 112 needs to access border router 102. When temporary GTK 318 is active, network 300 shown in FIG. 1 includes the first GTK associated with the first VPAN 110, a second GTK associated with the second VPAN 112, and the temporary GTK 318 (e.g., a third GTK).

FIG. 4 illustrates a flow diagram of an example method 400 for operating the network shown in FIG. 3. The operations described herein with respect to the method 400 may be performed by various components and systems, such as the components illustrated in FIGS. 1 and 3.

At operation 402 of method 400, the process may include a first device in a first VPAN contacting a second device in a second VPAN, where the first device requests access to a border router with which the second device is already communicating. As discussed above with respect to FIG. 3, the first device may not have an existing connection to the border router.

At operation 404, the process may include the first device being authorized by an AAA server. If the first device is authorized by the AAA server, a temporary GTK is generated by the AAA server, such that the temporary GTK is valid for a limited time period.

At operation 406, the process may include communicating the temporary GTK from the AAA server to the second device. In this situation, the second device may support a temporary communication of data between the first device and the border router during the limited time period associated with the temporary GTK.

At operation 408, the process may include the first device communicating with the border router (via the second device) using the temporary GTK during the limited time period.

Figure 5:
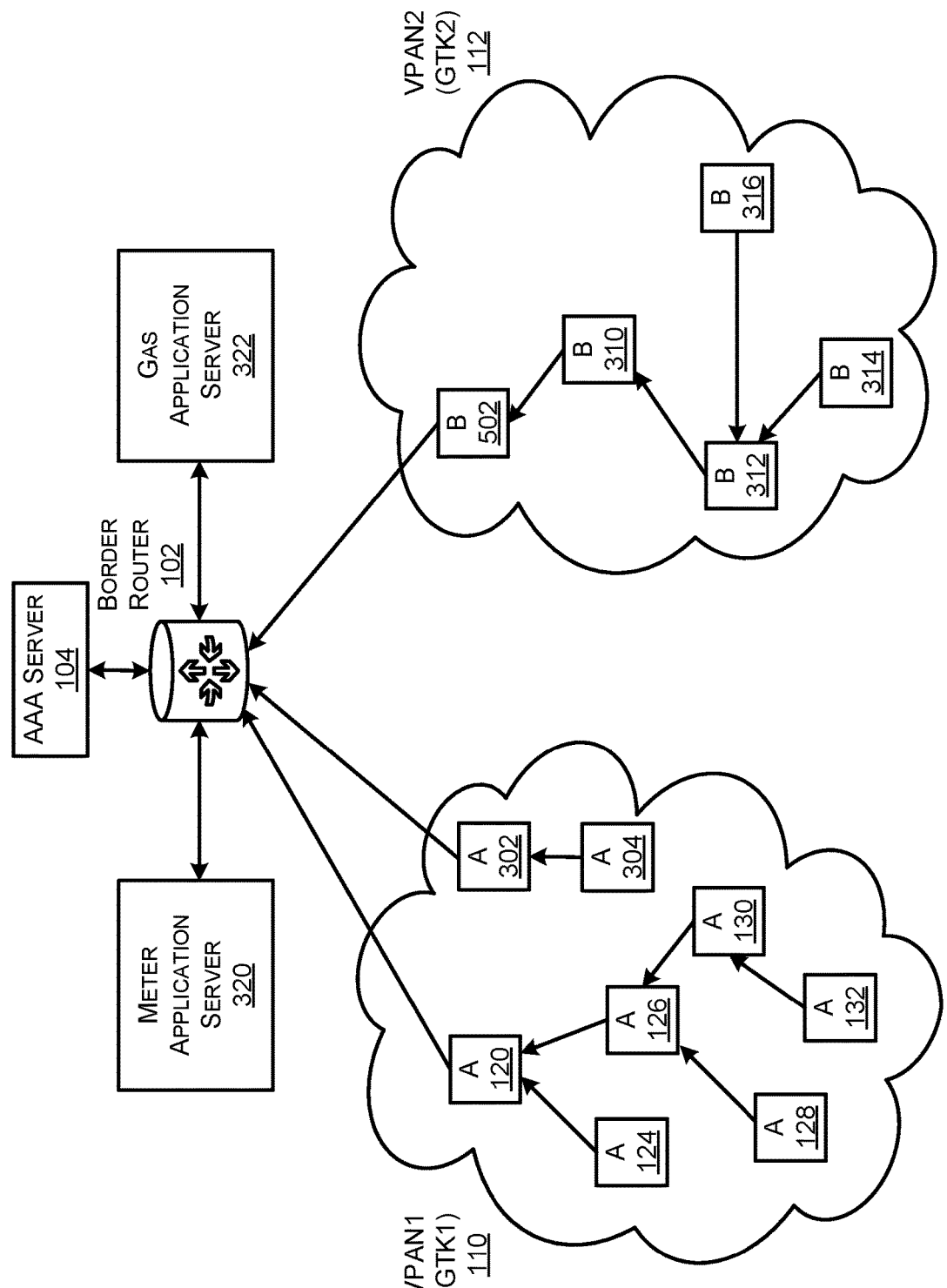
FIG. 5 illustrates another system-architecture diagram of an example network containing multiple devices, servers, and a border router.

FIG. 5 illustrates another system-architecture diagram of an example network 500 containing multiple devices, servers, and a border router. Network 500 is similar to network 300 discussed above with respect to FIG. 3 and includes many of the same components, servers, and systems. In network 500, a new device 502 becomes available in second VPAN 112. For example, the new device 502 may be newly installed or it may be an existing device that comes back online. As shown in FIG. 5, new device 502 establishes a connection with border router 102. New device 502 has the same sub-SSID and GTK as the other devices in second VPAN 112.

In this situation, device 310 can stop communicating with device 302 using the temporary GTK 318 to connect with border router 102. For example, device 310 may terminate the communication with device 302 and establish a new connection with new device 502, which provides a connection to border router 102. In some implementations, it is preferable to use the new device 502 for communicating with border router 102 instead of using the temporary connection with device 302 because communicating through new device 502 is more secure due to a more secure GTK that is associated with second VPAN 112.

FIG. 6 illustrates a flow diagram of an example method 600 for operating the network shown in FIG. 5. The operations described herein with respect to the method 600 may be performed by various components and systems, such as the components illustrated in FIGS. 1, 3, and 5.

At operation 602 of method 600, the process may include a first device in a first VPAN communicating with a border router through a second device in a second VPAN, where the second device is connected to the border router. At operation 604, the process may include a third device becoming active (e.g., a newly installed device or an existing device that comes back online) in the first VPAN.

At operation 606, the process may include the third device establishing a connection with the border router. At operation 608, the process may include the first device terminating its communication with the second device and establishing a connection with the third device to communicate with the border router.

Figure 7:
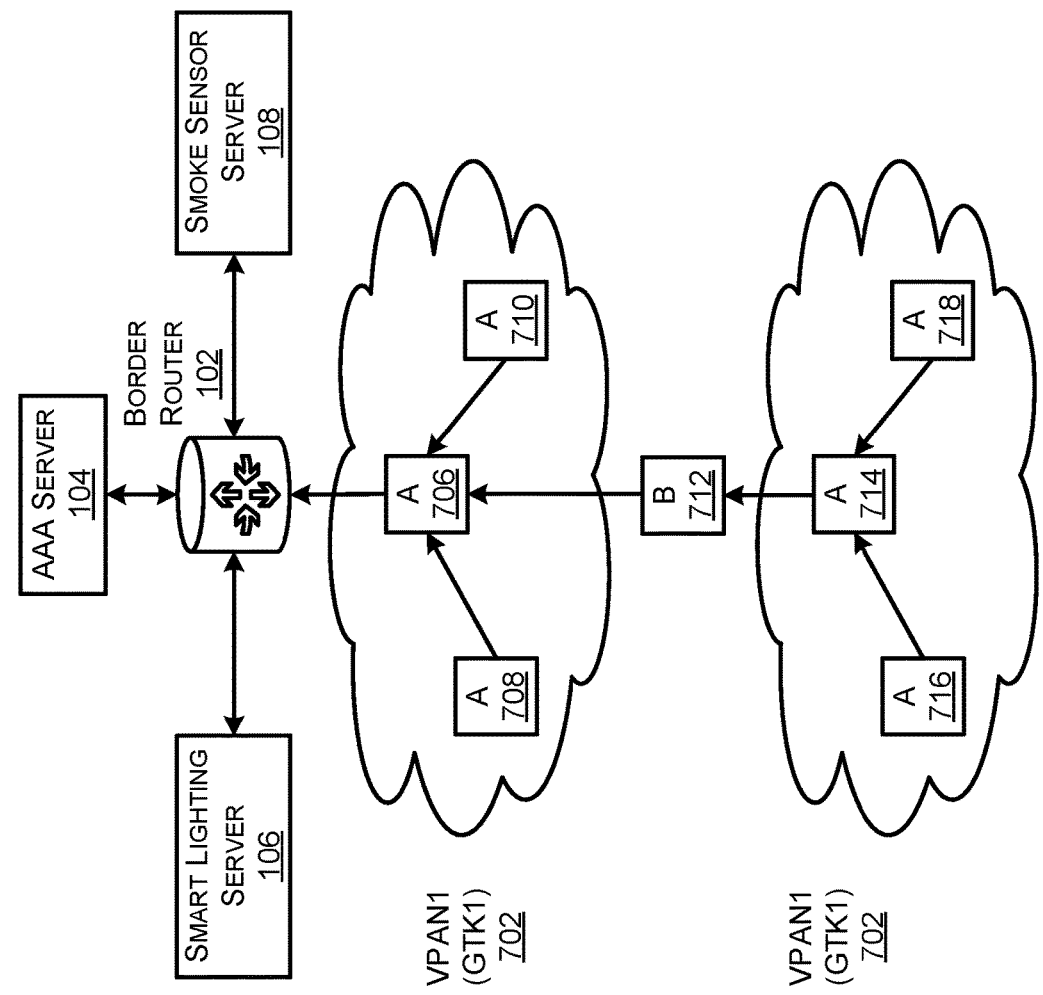
FIG. 7 illustrates another system-architecture diagram of an example network containing multiple devices, servers, and a border router.

FIG. 7 illustrates another system-architecture diagram of an example network 700 containing multiple devices, servers, and a border router. Network 700 includes border router 102, AAA server 104, smart lighting server 106, and smoke sensor server 108 as discussed above with respect to FIG. 1.

FIG. 7 also illustrates a first portion of a VPAN 702 that has an associated GTK and a second portion of VPAN 702 that has the same associated GTK. VPAN 702 includes multiple devices 706, 708, and 710 in the first portion and multiple devices 714, 716, and 718 in the second portion. In some embodiments, one or more of devices 706-710 and 714-718 are IoT devices.

As shown in FIG. 7, a device 712 is separate from both the first portion of VPAN 702 and the second portion of VPAN 702. Device 712 is a common neighbor of the two portions of VPAN 702.

In some embodiments, device 714 was previously connected to device 706 to establish a connection with border router 102. But, as shown in FIG. 7, that connection between devices 714 and 706 was broken or terminated (or otherwise not functioning properly). To reestablish a connection between device 714 and border router 102, the border router 102 may recognize that device 712 can act as a bridge between devices 714 and 706. Border router 102 then establishes that bridge so device 714 can communicate with border router 102 via device 712 and 706. In some implementations, device 712 merely forwards messages between devices 714 and 706. Device 712 does not typically decrypt the data received from either device 714 or 706. Thus, device 712 can use a different GTK than VPAN 702 since it is not attempting to decrypt the data.

In some embodiments, border router 102 may detect the failed connection between devices 706 and 714, and may determine that device 712 is connected to both devices 706 and 714. Based on this determination, border router 102 may configure device 712 as a bridge between devices 706 and 714.

Figure 8:
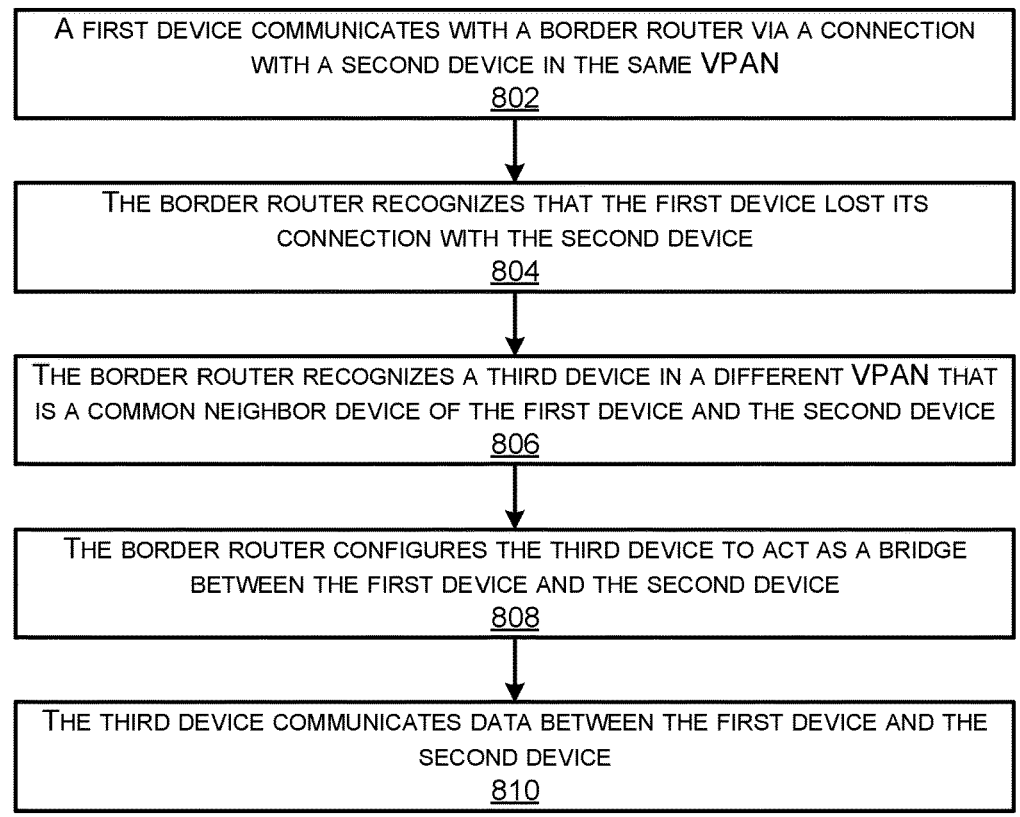
FIG. 8 illustrates a flow diagram of an example method for operating the network shown in FIG. 7.

FIG. 8 illustrates a flow diagram of an example method 800 for operating the network shown in FIG. 7. The operations described herein with respect to the method 800 may be performed by various components and systems, such as the components illustrated in FIG. 7.

At operation 802 of method 800, the process may include a first device communicating with a border router via a connection with a second device in the same VPAN. At operation 804, the process may include the border router recognizing that the first device lost its connection with the second device.

At operation 806, the process may include the border router recognizing that a third device in a different VPAN is a common neighbor device of the first device and the second device.

At operation 808, the process may include the border router configuring the third device to act as a bridge between the first device and the second device. At operation 810, the process may include the third device communicating data (e.g., data packets) between the first device and the second device.

Figure 9:
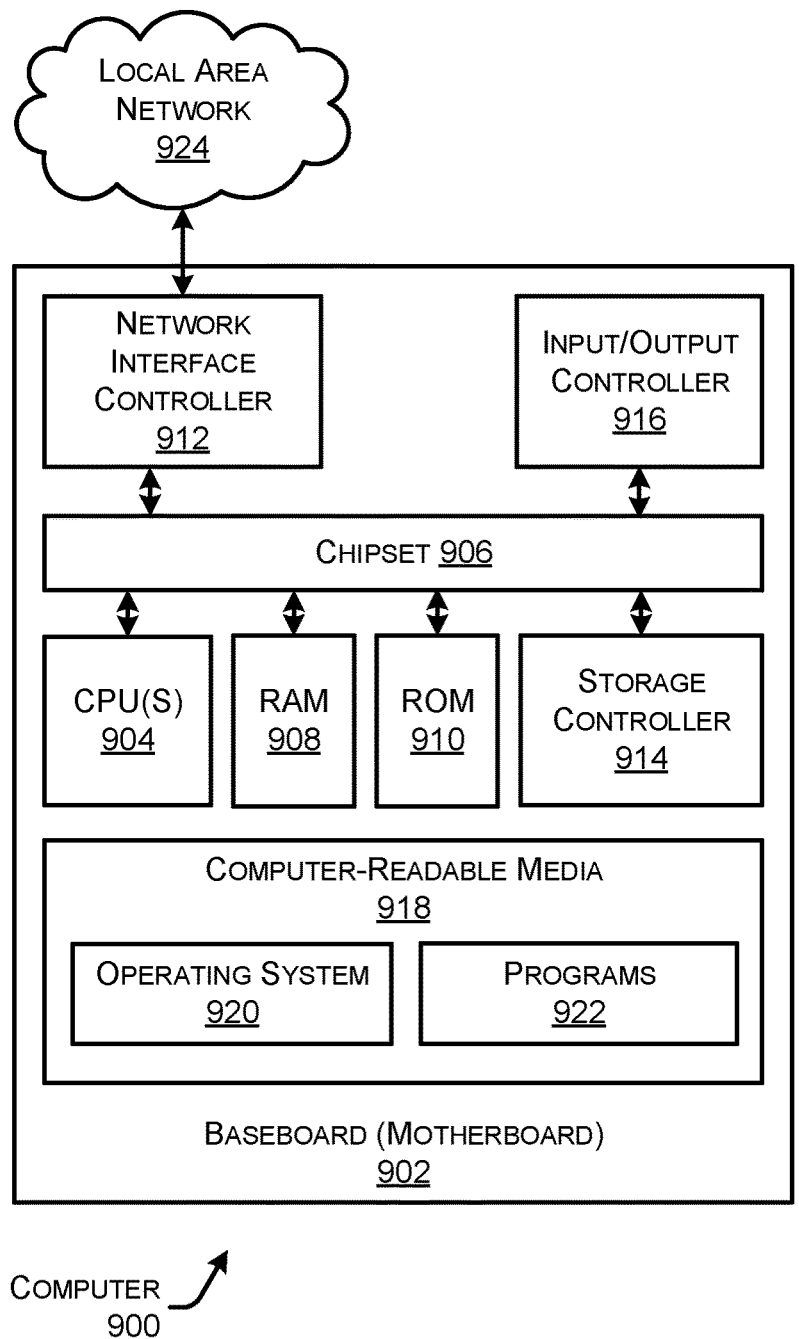
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described herein. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may, in some examples, correspond to any of the servers, routers, or devices discussed herein. In some embodiments, computer 900 may include networked devices such as servers, switches, routers, hubs, bridges, gateways, modems, repeaters, access points, etc. Additionally, in some implementations, the programs or software discussed herein may be configured to perform operations performed by any of the devices.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 924. The chipset 906 can include functionality for providing network connectivity through a Network Interface Controller (NIC) 912, such as a gigabit Ethernet adapter. The NIC 912 is capable of connecting the computer 900 to other computing devices over the network 924. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by devices in the distributed application architecture 102, and or any components included therein, may be supported by one or more devices similar to computer 900. Stated otherwise, some or all of the operations performed by the distributed application architecture 102, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described herein. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of a router, a border router, and/or a server. The computer 900 may include one or more hardware processors 904 (processors) configured to execute one or more stored instructions. The processor(s) 904 may comprise one or more cores. Further, the computer 900 may include one or more network interfaces configured to provide communications between the computer 900 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A border router comprising:
   one or more processors; and
   one or more non-transitory computer-readable media storing computer-executable instructions that, when executed by the one or more processors, cause the one or more processors to perform operations comprising:
   receiving a first request to join a network from a first device;
   authenticating the first device by communicating with an authentication, authorization, and accounting (AAA) server;
   assigning a first sub-SSID (Service Set Identifier) to a first virtual personal area network (VPAN), wherein the first VPAN is associated with a SSID;
   assigning, based at least in part on the first sub-SSID and in response to authenticating the first device, the first device to the first VPAN, wherein the first VPAN has an associated first group temporal key (GTK), wherein the first GTK is a temporary GTK that is valid for a limited time period and allows the first device to communicate with the second device during the limited time period;
   distributing the first GTK to the first device;
   receiving a second request to join the network from a second device;
   assigning a second sub-S SID to a second VPAN, wherein the second VPAN is associated with the SSID;
   assigning, based at least in part on the second sub-SSID, the second device to the second VPAN, wherein the second VPAN has an associated second GTK; and
   distributing the second GTK to the second device.

2. The border router of claim 1, wherein the second sub-SSID is different from the first sub-SSID.

3. The border router of claim 1, wherein:
   the first VPAN is associated with a first category of devices; and
   the second VPAN is associated with a second category of devices, wherein the second category of devices is different from the first category of devices.

4. The border router of claim 3, wherein the first category of devices includes at least one of a device type, a device security level, a device manufacturer, a device owner, or a device location.

5. The border router of claim 1, wherein the second device is coupled to the border router and the first device communicates with the border router through the second device.

6. The border router of claim 5, the operations further comprising:
   receiving a request to join the network from a third device;
   assigning the third device to the first VPAN;
   connecting the third device to the border router; and
   coupling the first device to communicate with the border router through the third device.

7. The border router of claim 1, the operations further comprising:
   recognizing a failed connection between the first device in the first VPAN and a third device in the first VPAN;
   identifying a fourth device in a third VPAN that is located proximate to the first device and the third device; and
   configuring the fourth device to communicate data packets between the first device and the third device.

8. The border router of claim 1, wherein the second GTK is different from the first GTK.

9. The border router of claim 1, further comprising:
   authenticating the second device by the AAA server, wherein assigning the second device to the second VPAN is in response to authenticating the second device.

10. A method performed at least partly by a border router, the method comprising:
    receiving, at the border router, a first request to join a network from a first device;
    authenticating the first device by an authentication, authorization, and accounting (AAA) server;

assigning a first sub-SSID (Service Set Identifier) to a first virtual personal area network (VPAN), wherein the first VPAN is associated with a SSID;

assigning, based at least in part on the first sub-SSID and in response to authenticating the first device, the first device to the first VPAN, wherein the first VPAN has an associated first group temporal key (GTK), wherein the first GTK is a temporary GTK that is valid for a limited time period and allows the first device to communicate with the second device during the limited time period;

distributing the first GTK to the first device;

receiving, at the border router, a second request to join the network from a second device;

assigning a second sub-SSID to a second VPAN, wherein the second VPAN is associated with the SSID;

assigning, based at least in part on the second sub-SSID, the second device to the second VPAN, wherein the second VPAN has an associated second GTK; and distributing the second GTK to the second device.

11. The method of claim 10, wherein the second sub-SSID is different from the first sub-SSID.

12. The method of claim 10, wherein:

the first VPAN is associated with a first category of devices; and the second VPAN is associated with a second category of devices, wherein the second category of devices is different from the first category of devices.

13. The method of claim 12, wherein the first category of devices includes at least one of a device type, a device security level, a device manufacturer, a device owner, or a device location.

14. The method of claim 10, wherein the second GTK is different from the first GTK.

15. The method of claim 10, further comprising:

authenticating the second device by the AAA server, wherein assigning the second device to the second VPAN is in response to authenticating the second device.

16. One or more non-transitory computer-readable media storing instructions that, when executed, cause one or more processors to perform operations comprising:

receiving a first request to join a network from a first device;

authenticating the first device by an authentication, authorization, and accounting (AAA) server;

assigning a first sub-SSID (Service Set Identifier) to a first virtual personal area network (VPAN), the first VPAN being associated with a SSID;

assigning, based at least in part on the first sub-SSID and in response to authenticating the first device, the first device to the first VPAN, wherein the first VPAN has an associated first group temporal key (GTK), and wherein the first sub-SSID is associated with the first VPAN, wherein the first GTK is a temporary GTK that is valid for a limited time period and allows the first device to communicate with the second device during the limited time period;

distributing the first GTK to the first device;

receiving a second request to join the network from a second device;

assigning a second sub-SSID to a second VPAN, the second VPAN being associated with the SSID;

assigning, based at least in part on the second sub-SSID, the second device to the second VPAN, wherein the second VPAN has an associated second GTK, and wherein the second sub-SSID is associated with the second VPAN; and distributing the second GTK to the second device.

17. The one or more non-transitory computer-readable media of claim 16, wherein:

the first VPAN is associated with a first category of devices; and the second VPAN is associated with a second category of devices, wherein the second category of devices is different from the first category of devices.

18. The one or more non-transitory computer-readable media of claim 17, wherein the first category of devices includes at least one of a device type, a device security level, a device manufacturer, a device owner, or a device location.

19. The one or more non-transitory computer-readable media of claim 16, wherein the second device is coupled to a border router and the first device communicates with the border router through the second device.

20. The one or more non-transitory computer-readable media of claim 19, wherein the operations further comprise:

receiving a request to join the network from a third device;

assigning the third device to the first VPAN;

connecting the third device to the border router; and coupling the first device to communicate with the border router through the third device.

* * * * *